(12) United States Patent
Dudley et al.

(10) Patent No.: US 6,614,813 B1
(45) Date of Patent: Sep. 2, 2003

(54) MULTIPLEXED CHIRP WAVEFORM SYNTHESIZER

(75) Inventors: Peter A. Dudley, Albuquerque, NM (US); Bert L. Tise, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/238,762

(22) Filed: Jan. 28, 1999

(51) Int. Cl.[7] .................................................. H04J 3/04
(52) U.S. Cl. ...................................................... 370/532
(58) Field of Search ................................ 370/532, 535, 370/537, 347, 345, 441, 442, 206, 207, 208, 209, 210, 342, 465, 466; 375/130, 139, 145, 237, 238, 239, 242, 347, 132, 219, 222, 131, 133, 377; 342/201, 202, 165, 70; 331/178, 47, 4

(56) References Cited

U.S. PATENT DOCUMENTS 5,016,018 A * 5/1991 Chang et al. ................ 342/351
5,339,275 A * 8/1994 Hyatt ........................... 365/45
5,708,436 A * 1/1998 Loiz et al. ..................... 342/25

OTHER PUBLICATIONS

Osicom–Direct Digital Synthesis Tutorial, Direct–Digital Frequency Synthesis, Nov. 17, 1998, pp 1–11.

Brett l. Remund and Chakra R. Srivatsa, A 500 MHZ Phase Generator For Synthetic Aperture Radar Waveform Synthesizers, Sand 91–0966C, pp1–4.

* cited by examiner

Primary Examiner—Dang Ton
(74) Attorney, Agent, or Firm—George H. Libman

(57) ABSTRACT

A synthesizer for generating a desired chirp signal has M parallel channels, where M is an integer greater than 1, each channel including a chirp waveform synthesizer generating at an output a portion of a digital representation of the desired chirp signal; and a multiplexer for multiplexing the M outputs to create a digital representation of the desired chirp signal. Preferably, each channel receives input information that is a function of information representing the desired chirp signal.

18 Claims, 4 Drawing Sheets

MULTIPLEXED CHIRP WAVEFORM SYNTHESIZER

The United States Government has rights in this invention pursuant to Department of Energy Contract No. DE-AC04-94AL85000 with Sandia Corporation.

CROSS REFERENCE TO RELATED APPLICATIONS (Not Applicable)

BACKGROUND OF THE INVENTION

Many radar applications, including synthetic aperture radar (SAR), require fine range resolution. A simplistic method of achieving fine range resolution is to transmit a very narrow pulse and adequately sample the returned echo. This method, while simple in theory, has some practical limitations: very high peak transmitter power and very high bandwidth for an analog-to-digital (A/D) converter.

Pulse compression is one known radar technique for reducing peak transmitter power while maintaining a fixed average transmitter power by coding the transmitted waveform in such a manner as to be able to decode the received echo into the various constituents of the transmitted code.

Some pulse compression schemes, such as binary and polyphase codes, literally change the phase of the transmitted signal at regular sub-pulse intervals. The length of these sub-pulse intervals determines the achievable range resolution.

Another pulse compression scheme involves continuously varying the phase of the transmitted waveform. When this phase variation is quadratic (and, therefore, the frequency variation is linear), the method is called linear FM pulse, or chirp pulse compression. Such a waveform is described by:

$$y(t)=\sin(\{2\pi(f_0 t+0.5kt^2+\phi_0)\}), \ 0 \leq t \leq \tau \qquad \text{eq. 1}$$

where k is the linear chirp rate, $\tau$ is the pulse length, and $f_0$ and $\phi_0$ are the starting frequency and phase of the waveform, respectively.

A preferred technique for implementing chirp pulse compression utilizes the direct-digital-synthesis (DDS) circuitry of prior art FIG. 1 to generate y(f). Conventional frequency accumulator 2 includes an adder 32 in series with a register 34 and a feedback loop 36 from the output of register 34 to the input through adder 32. This circuit accumulates, or integrates, the chirp rate constant, k, and adds it to a programmed starting frequency $f_0$ (which had been loaded into register 34) to provide an output $f(t)=f_0+kt$, the instantaneous frequency. This output is used as the input to phase accumulator 4 where the linear frequency term is integrated to provide an output $\phi(t)=f_0 t-kt/2+kt^2/2+\phi_0$, the instantaneous phase. The combination of these first two accumulators is collectively known as the phase generator PG. The output of phase accumulator 4 is applied as an address to a mapping device such as look-up table ROM 6 which contains one cycle of a sine. The resulting output of ROM 6 takes the form of equation 1. This circuit is recognizable as the digital portion of a conventional DDS (formed by phase accumulator 4, look-up table ROM 6), with the addition of a frequency accumulator 2 at the input to provide for the changing frequency of the chirp generator. The output of look-up table ROM 6 is fed through a D/A converter 7 to provide an analog signal for transmission by a radar. The phase error correction look up table (PEC LUT) 8 is an important part of most modem chirp synthesizers that compensates for non-linearity's in RF components of a radar in a manner known to those of ordinary skill in the art.

The advantages of this design include a waveform length independent of hardware configuration, ease of changing waveform parameters, a capability of generating a continuous, constant frequency (CW) sinusoid, and a small part count. To change waveform parameters, all that is required is to change the values for the starting frequency $f_0$, the starting phase $\phi_0$, and the chirp rate k, all of which values are stored in registers. Pulse length, $\tau$, is also programmable. If desired, these parameters may be changed on a pulse by pulse basis. Since a chirp radar system requires two waveforms, one for use during transmit and a second for use during receive, the wave form synthesizer (WFM) chirp generator of FIG. 1 may be used with the starting frequency and pulse duration for each pulse loaded into different registers to permit independent specification of the transmit and receive waveforms.

The implementation of the chirp generator of FIG. 1 may take many embodiments. However, this generator, and DDS systems in general, are limited in output to about 50% of the clock frequency because of the Nyquist sampling theorem. To generate an output frequency on the order at a sampling rate of 1 GHz, prior art systems have utilized expensive, high power, custom made GaAs integrated circuits. (See, for example, B. Redmund et al., *A 500 MHz Phase Generator for Synthetic Aperture Radar Waveform Synthesizers*, Sandia National Laboratories publication SAND 91-0966C, July 1991.)

SUMMARY OF THE INVENTION

It is an object of this invention to provide a high frequency chirp circuit utilizing commercially available components. This and other objects and advantages of the invention may be realized and attained as particularly pointed out in the appended claims.

To achieve the foregoing and other objects, and in accordance with the purpose of the present invention, as embodied and broadly described herein, the present invention may comprise a synthesizer for generating a desired chirp signal comprising M parallel channels, where M is an integer greater than 1, each channel including a chirp waveform synthesizer generating at an output a portion of a digital representation of the desired chirp signal; and a multiplexer for multiplexing the M outputs to create a digital representation of the desired chirp signal. Preferably, each channel receives input information that is a function of information representing the desired chirp signal.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

The theory behind this invention is relatively simple. In the prior art single channel chirp synthesizer of FIG. 1 with registers P (phase), F (frequency), and K (chirp rate), the register values as a function of clock cycle (n) are given by:

$$K_s = \text{ChirpRate} \qquad \text{eq. 2}$$

$$F_s(n) = F_s(0) + K_s n \qquad \text{eq. 3}$$

$$P_s(n) = P_s(0) + F_s(0)n + \tfrac{1}{2}K_s(n^2 - n) \quad n=0,1,2,3,\ldots \qquad \text{eq. 4}$$

$$y(n) = \sin[P(n)] \qquad \text{eq. 5}$$

where $F_s(0)$ represents the desired start frequency of the chirp waveform and y(n) gives the output of the sine ROM 6. As is well known in the art, D/A converter 7 converts the digital data stream P(n) to P(t), a continuous time function where $t=n*T_s$, and $T_s$ is the sample period and $S=1/T_s$ is the sample frequency of the D/A converter.

Figure 1:
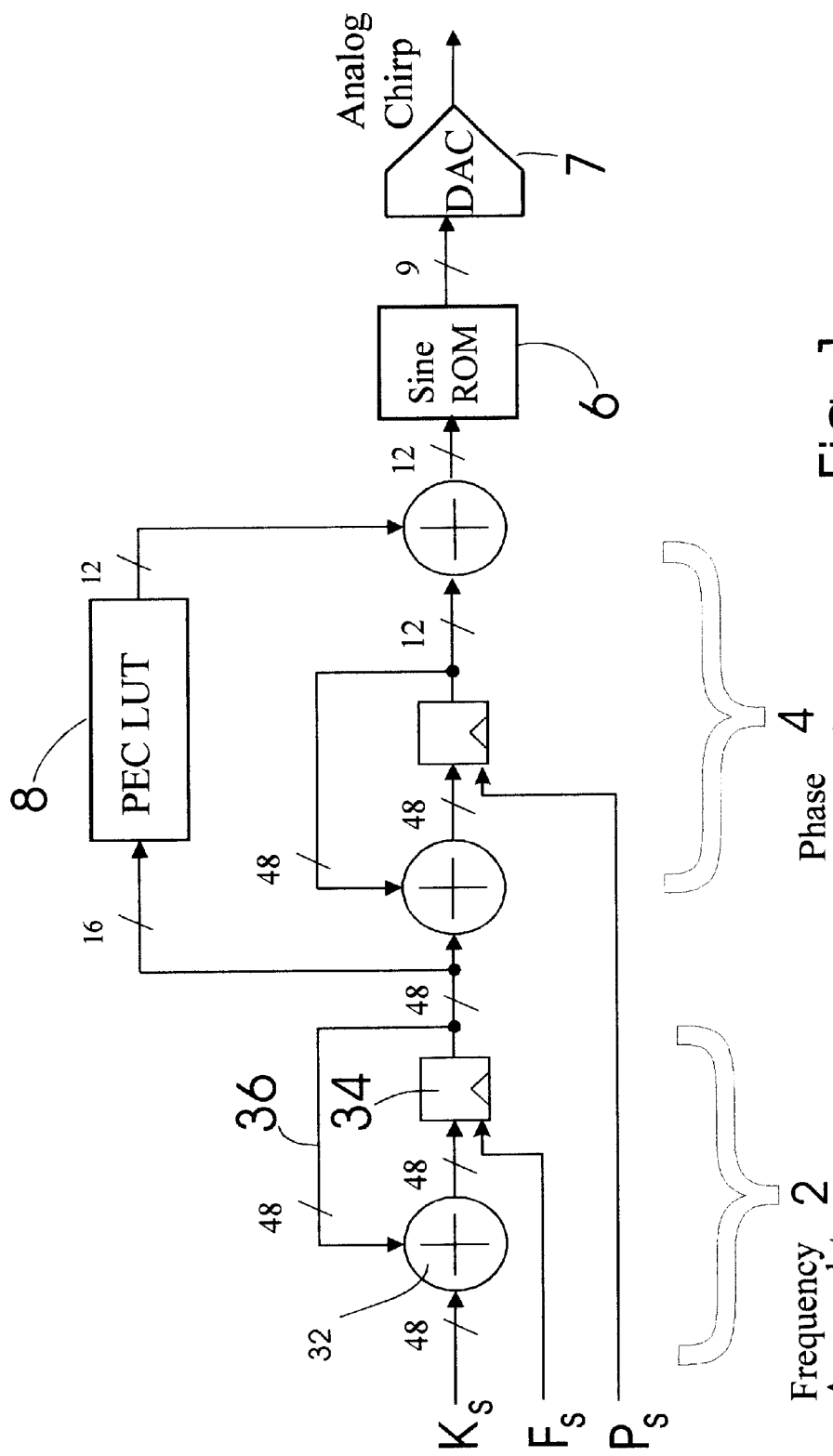
FIG. 1 shows a prior art chirp synthesizer.

The objective of the invention is to combine M parallel channels of chirp waveform synthesis, with each channel running at only S/M, in such a way that the input values for starting phase, frequency and chirp rate are identical to those applied to the WFS of FIG. 1, and the output of the combined channels is identical to the output of the prior art MWS of FIG.1.

Figure 2:
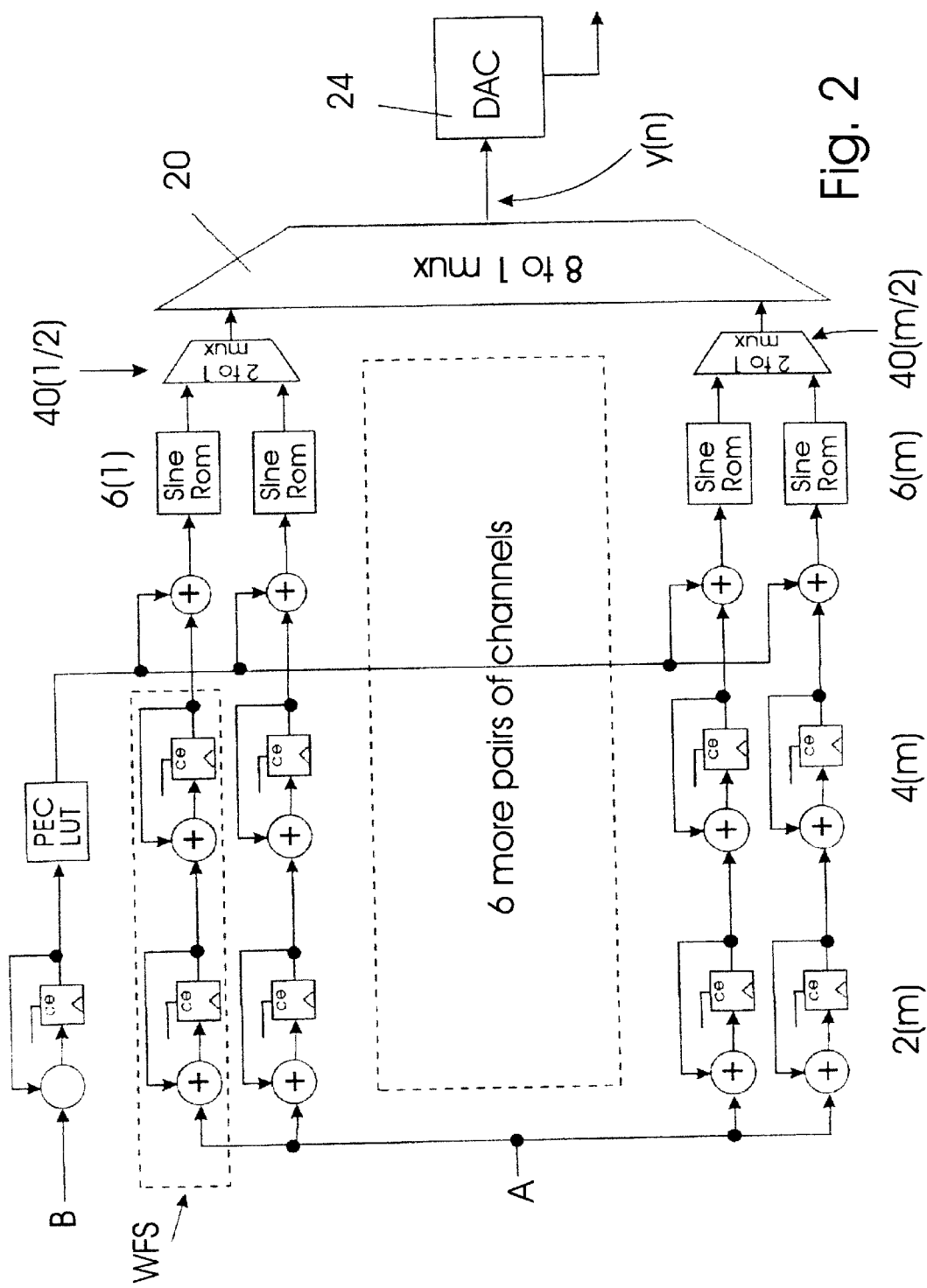
FIG. 2 shows the Multiplexed Waveform Synthesizer (MWFS)

This objective is achieved by the multiplexed waveform synthesizer (MWFS) of FIG. 2. In this scheme the M-to-1 multiplexer 20 receives data from all M channels every M clock cycles and outputs this data sequentially as y(n) through a D/A converter 24 to form the analog radar signal. Each channel m of the MWFS is similar to the WFS of FIG. 1 as they include a frequency accumulator 2(m), a phase accumulator 4(m), and a sine look up table 6(m). However, each channel processes its part of the output at a rate of S/M, which enables each channel to be implemented in low cost CMOS logic. Only the output stages of multiplexer 20 and D/A 24 operate at the much higher rate S.

In accordance with the invention, if there are M parallel channels of chirp waveform generators, then the output of the accumulators of the $m^{th}$ channel will be denoted:

$$F_m(n) = F_m(0) + K_m n \quad m=0,1,2,\ldots M-1 \qquad \text{eq. 6}$$

$$P_m(n) = P_m(0) + F_m(0)n + \frac{1}{2}K_m(n^2 - n) \qquad \text{eq. 7}$$

where $F_m(0)$ and $P_m(0)$ are the starting values for the frequency and phase accumulators, respectively, of the $m^{th}$ channel.

In order for the MWFS to produce the same results as the single channel synthesizer, we must have: $P_m(n)=P_s(M\cdot n+m)$ where $P_s(n)$ is the phase output of the prior art single channel WFS of FIG. 1, $P_m(n)$ is the output of the $m^{th}$ channel of the MWFS, and M is the number of channels in the MWFS. A little algebra reveals the necessary terms.

$$P_m(n) = P_s(0) + F_s(0)(Mn + m) + \frac{1}{2}K_s[(Mn+m)^2 - (Mn+m)]$$

or $$P_m(n) = P_s(0) + mF_s(0) + \frac{1}{2}K_s(m^2 + m) + $$
$$n\left[M(F_s(0) + K_s m) + \frac{1}{2}M^2 K_s - \frac{1}{2}MK_s\right] + \frac{1}{2}K_s M^2(n^2 - n)$$

which is in the same form as eq. 7. Accordingly, the starting values of the accumulators of the M channels are:

$$P_m(0) = P_s(0) + mF_s(0) + \frac{1}{2}K_s(m^2 - m) \qquad \text{eq. 8}$$

$$F_m(0) = M(F_s(0) + K_s m) + \frac{1}{2}M^2 K_s - \frac{1}{2}MK_s \qquad \text{eq. 9}$$

$$K_m = K_s M^2 \qquad \text{eq. 10.}$$

A major aspect of this invention is how the frequency and phase accumulators of each channel are efficiently loaded with the appropriate starting values. This task is the responsibility of the initializer circuit 50 of FIG. 3.

Initializer 50 has sections for generating phase, frequency, and chirp rate information, and a finite state machine (FSM) 60 for providing clock enable signals and controlling the system. Registers 53–57 control the flow of data through initializer 60 as their clock enable ports are activated by FSM 60 in a conventional manner to those of ordinary skill in the art. In a similar manner, the select lines (not shown) of the multiplexers are also controlled by FSM 60 A multiplexer 52 receives this data and passes it through register 54 to point A on FIG. 2.

The starting phase information, $P_s(0)$, is applied directly to multiplexer 52 through register 53. Referring to eqs. 4 and 8 above, the starting value $P_m(0)$ for the phase register 2(m) of the $m^{th}$ channel is exactly the value of the single channel WFS after it is clocked m times. Therefore, the phase register starting values for the each channel are set by loading the single channel starting values $F_s(0)$ and $P_s(0)$ into the frequency and phase accumulators of all the channels under the control of the FSM and then clock enabling each channel m that number of times (i.e., channel 2 is clocked twice; channel 12 is clocked 12 times).

The starting frequency information, $F_s(0)$, is applied to multiplexer 52 through a combination of multiplexers and gates, as illustrated. The first term of eq. 9 can be generated by loading all the frequency accumulators with $M*F_s(0)$ and then adding $M*K_s$, m times. The multiplication by M is performed in the initializer's arithmetic logic; the addition is done in the frequency accumulator of the channel. The next two terms of eq. 9 are similarly produced in the arithmetic logic of the initializer and accumulated into the frequency accumulators 2(m) of the channels.

The final step to initialize the channels is to form the correct value for $K_m=M^2* K_s$. This value is computed in the arithmetic logic of the feedback loop 58 of the initializer and placed on the K bus of the MWFS.

Chirp synthesis begins when all accumulators of the MWFS are turned on. A final note should be made about the accumulator for the PEC LUT. It is loaded initially with $F_s(0)$ from FSM 60, and it has a constant value of $M*K_s$ on the accumulator input during chirp synthesis that is provided by output B of initializer 60

There is a significant advantage to having the number of channels $M=2^k$, where k is a positive integer (M=2,4,8,16, . . . ). In this case, the multiplications referred to above may be accomplished by merely shifting the bits in a register in a manner well known in the art. For a different number of channels, more complicated circuitry must be utilized to perform the multiplications To prove the concept of this invention, a computer program was written to show that the outputs of the m channels would combine to form the same output as a single high speed channel. Even though no single channel had a signal that was recognizable as the desired output, the combination of all channels was shown to be identical to the output from a single high speed channel.

A preferred embodiment of a multiplexed waveform synthesizer (MWFS) in accordance with this invention has been constructed on a single VME card that uses direct digital synthesis (DDS) techniques for chirp generation. (A VME card is a card utilized with a VersaModule Eurocard bus, a 32-bit bus developed by Motorola, Signetics, Mostek and Thompson CSF that is widely used in industrial, commercial and military applications.) The MWFS is designed to support pulse compression in Synthetic Aperture Radar (SAR) by generating chirps at 1000 megasamples/second to provide 50 MHz to 450 MHz sinusoidal outputs.

The preferred embodiment MWFS contains $M=2^4=16$ WFS channels implemented in two identical CMOS Field Programmable Gate Arrays (FPGA's) (not shown). The programming of FPGAs to implement digital circuitry is a routine manner for those of ordinary skill in the art and does not form part of this invention. This circuit could also be implemented as a physical circuit using standard manufacturing techniques, but the FPGA embodiment does offer the additional benefit of flexibility, so that different configurations may be utilized for different missions.

Figure 3:
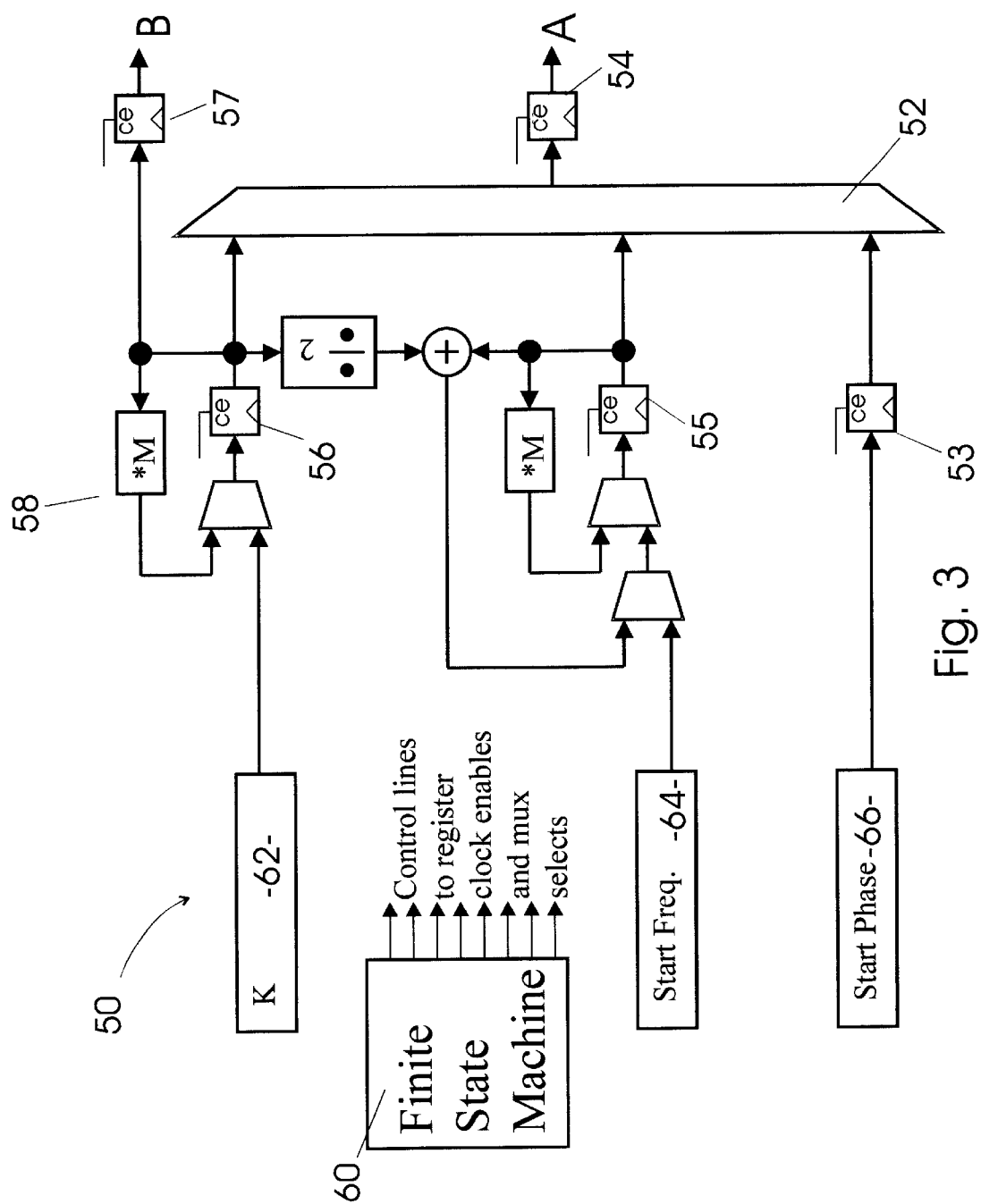
FIG. 3 shows the initializer for the MWFS.
Figure 4:
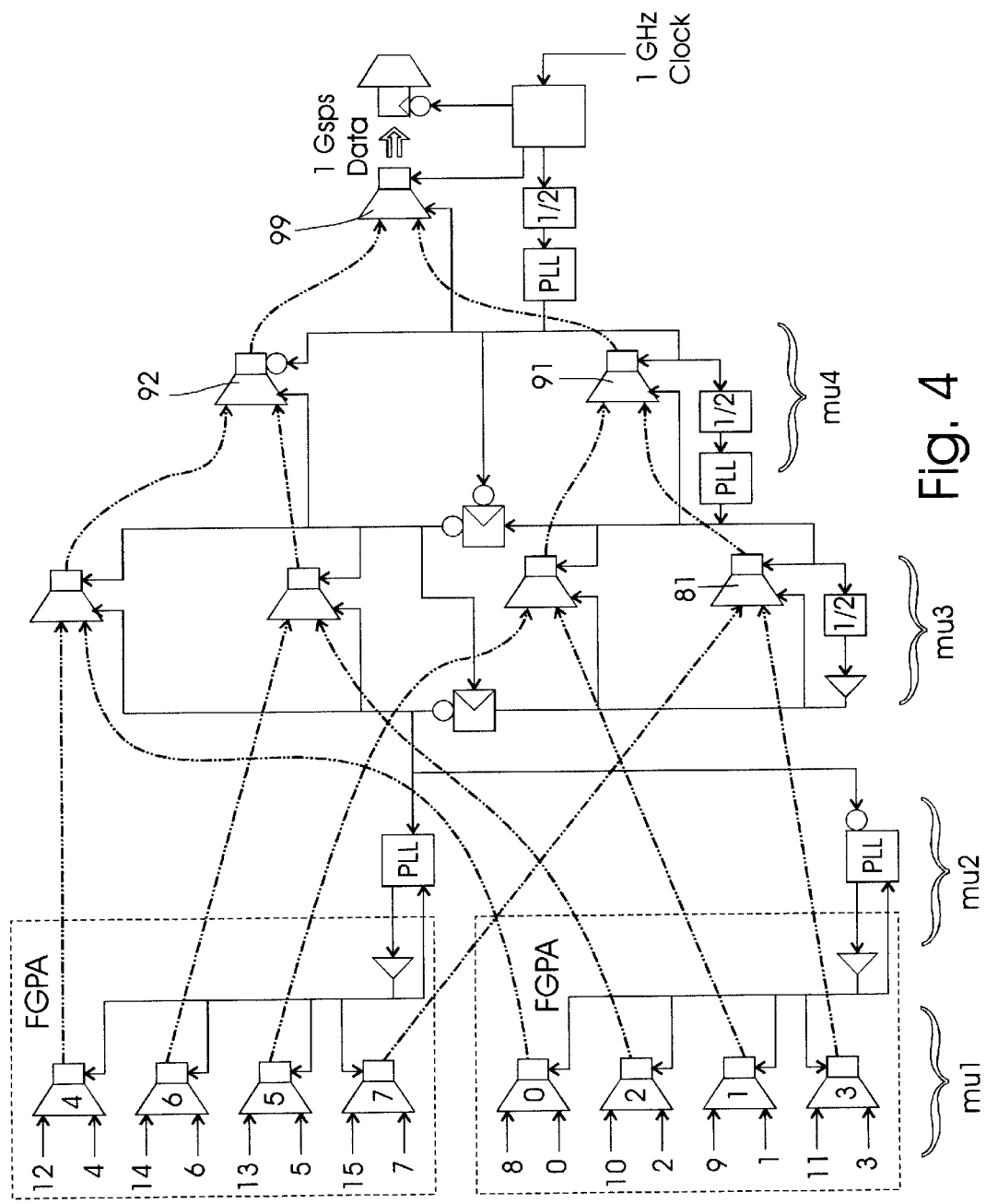
FIG. 4 shows an embodiment of the multiplexer of the invention.

As shown in FIG. 4, eight channels ($M=2^3$) are implemented in each of two FPGAs. Initializer 60 of FIG. 3 is also implemented in at least one FPGA. Each WFS channel runs at S/M=1000 MHz/16=62.5 MHz. FIG. 2 shows that each WFS channel also includes a four quadrant sine ROM 6(m) with 12 phase input bits and 9 magnitude output bits. In this embodiment, the individual WFS channels are arranged in pairs and each pair is multiplexed together through 2-1 mux 40 (m/2) to form a 125 MHz data stream before leaving the FPGA. These 125 MHz streams are then multiplexed together in 8-1 mux 20 which is implemented using commercial ECL logic chips as shown in FIG. 4 to form the 1000 MHz data stream. The output of eight-to-one multiplexer 20 feeds a Digital to Analog Converter 24 to generate the desired analog chirp signal.

As implemented, each WFS channel includes 36 bit frequency and phase accumulators that run at 62.5 MHz. Each of these accumulators is preferably implemented as a 6 way pipeline in order to achieve the desired 62.5 MHz clock rate. In order to fit 8 sine ROM's 6(m) into each FPGA, it was necessary to use a standard Sine Table compression scheme similar to the Multiplying Sine ROM. Implementation of a look up table for this invention is a routine matter of design to those of ordinary skill in the art.

As mentioned earlier, the WFS channels are split between two FPGA's and both these FPGA's must receive the same information from the VME bus. To simplify programming and save access time the FPGA's have been mapped so that the same register in both FPGA's can be accessed with a single VME cycle. All of the waveform synthesizers preferably would have been implemented on a single device if a larger FPGA had been available.

The ECL 8-to-1 multiplexer 20 required phase locked loops (PLL's) and precisely controlled trace lengths to function properly. A diagram of multiplexers 40 and 20 is shown in FIG. 4 to include four levels of 2-stage of multiplexing (mu1, mu2, mu3, mu4), with the inputs for each stage being selected to maximize the time between signal inputs for each stage. For example, channels 3 and 11 are combined in multiplexer 3 of stage mu1 while channels 7 and 15 are combined in multiplexer 7. The outputs of these two multiplexers are combined in multiplexer 81 of stage mu2. As shown in FIG. 4, all odd numbered channels are combined in multiplexer 91 of stage mu3, and all even numbered channels are combined in multiplexer 92. Only output multiplexer 99 of stage mu4 and D/A converter 24 are clocked at the 1 GHz sample rate S.

The input values of start phase, frequency, and chirp rate for this embodiment of the invention have been loaded into registers 62, 64, and 66 in the same manner as they would have been for a single channel synthesizer. The output chirp waveform from D/A converter 24 is identical to the output of a single channel synthesizer. However, this embodiment generated the signal at a 1 GHz sample rate utilizing mostly CMOS circuitry instead of the expensive GaAs circuitry that would be required for a single channel circuit.

The particular sizes and equipment discussed above are cited merely to illustrate a particular embodiment of this invention. It is contemplated that the use of the invention may involve components having different sizes and shapes as long as the principle, multiplexing low-speed waveform synthesizers to create a high speed chirp, is followed. For example, if the accumulator widths or sine ROM sizes were to change, the claims of this document would still apply. It is intended that the scope of the invention be defined by the claims appended hereto.

What is claimed is:

1. A multiplexed waveform synthesizer for generating a desired chirp signal comprising:

M parallel channels, where $M=2^k$ where k is a positive integer greater than 1, each channel comprising a chirp waveform synthesizer generating at an output a portion of a digital representation of the desired chirp signal; and multiplexer means for multiplexing the M outputs to create a digital representation of the desired chirp signal.

2. A multiplexed waveform synthesizer for generating a desired chirp signal comprising:

M parallel channels, where M is an integer greater than 1, wherein each channel is a double accumulator chirp synthesizer for generating a portion of a digital representation of the desired chirp signal and comprises:

a frequency accumulator for generating an output representative of a desired frequency range;

a phase accumulator in series with said frequency accumulator for generating an instantaneous phase output representative of a desired waveform; and a mapping device for transforming the output of said phase accumulator to a digital function of a sine wave at the frequency of said frequency accumulator, each said mapping device having an output;

multiplexer means for multiplexing the M outputs of said mapping devices to create a digital representation of the desired chirp signal; and an initializor for receiving inputs representative of the desired chirp signal, said initializor having output means for providing input information to each of said chirp waveform synthesizers.

3. The multiplexed waveform synthesizer of claim 2 further comprising a digital to analog converter for receiving said digital representation from said multiplexer to generate said chirp waveform.

4. The multiplexed waveform synthesizer of claim 2 wherein each accumulator is clocked at 1/M the clock rate at which the digital representation of the desired chirp signal is clocked.

5. The multiplexed waveform synthesizer of claim 3 wherein each accumulator is clocked at 1/M the clock rate at which the digital to analog converter is clocked.

6. The multiplexed waveform synthesizer of claim 1 further comprising an initializor for receiving inputs representative of the desired chirp signal, said initializor having output means for providing input information to each channel.

7. The multiplexed waveform synthesizer of claim 6 wherein the inptuts representative of the desired chirp signal comprise starting frequency $F_s(0)$, phase $P_s(0)$, and chirp rate $K_s$ for a single channel synthesizer to provide the desired output.

8. The multiplexed waveform synthesizer of claim 7 wherein:

$$P_m(0) = P_s(0) + mF_s(0) + \frac{1}{2}K_s(m^2 - m)$$

$$F_m(0) = M(F_s(0) + K_s m) + \frac{1}{2}M^2 K_s - \frac{1}{2}MK_s$$

$$K_m = K_s M^2$$

where m is an integer between 0 and M−1 identifying each channel, $P_m(0)$ is the starting phase for each channel, $F_m(0)$ is the starting frequency for each channel, and $K_m$ is the starting chirp rate for each channel.

9. The multiplexed waveform synthesizer of claim 8 further comprising digital to analog converter for receiving said digital representation from said multiplexer to generate said chirp waveform.

10. The multiplexed waveform synthesizer of claim 2 wherein the input information is the starting phase $P_m(0)$ for said phase accumulator of each channel m, starting frequency $F_m(0)$ for said frequency accumulator of each channel m, and starting chirp rate $K_m$ for each channel m, said input information being provided to each accumulator of each chirp waveform synthesizer.

11. The multiplexed waveform synthesizer of claim 10 wherein:

$$P_m(0) = P_s(0) + mF_s(0) + \frac{1}{2}K_s(m^2 - m)$$

$$F_m(0) = M(F_s(0) + K_s m) + \frac{1}{2}M^2 K_s - \frac{1}{2}MK_s$$

where $F_s(0)$, $P_s(0)$, and $K_s$ are the starting frequency, phase, and chirp rate for a single channel synthesizer to provide the desired output.

12. The multiplexed waveform synthesizer of claim 4 where $M=2^k$ where k is a positive integer.

13. The multiplexed waveform synthesizer of claim 5 where $M=2^k$ where k is a positive integer.

14. The multiplexed waveform synthesizer of claim 11 where $M=2^k$ where k is a positive integer.

15. The multiplexed waveform synthesizer of claim 1 further comprising means for providing information representative of the desired chirp signal to each of said chirp waveform synthesizers.

16. The multiplexed waveform synthesizer of claim 11 further comprising a digital to analog converter connected in series with said multiplexer for creating an anolog chirp signal.

17. The multiplexed waveform synthesizer of claim 16 wherein each accumulator is clocked at 1/M the clock rate at which the digital to analog converter is clocked.

18. The multiplexed waveform synthesizer of claim 1 wherein the digital representation of the desired chirp signal is clocked at M dimes the clock rate of each channel's waveform synthesizer.

* * * * *